(12) United States Patent
Fahlenkamp et al.

(10) Patent No.: US 6,735,095 B2
(45) Date of Patent: May 11, 2004

(54) SWITCHED-MODE POWER SUPPLY WITH A FUNCTION FOR DETECTING A BROKEN FEEDBACK LOOP

(75) Inventors: Marc Fahlenkamp, München (DE); Hartmut Jasberg, Ottobrunn (DE); Martin Feldtkeller, München (DE); Harald Zoellinger, Gilching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/330,947

(22) Filed: Dec. 27, 2002

(65) Prior Publication Data

US 2003/0117819 A1 Jun. 26, 2003

Related U.S. Application Data

(63) Continuation of application No. PCT/EP01/07004, filed on Jun. 21, 2001.

(30) Foreign Application Priority Data

Jun. 27, 2000 (DE) .......................................... 100 31 188

(51) Int. Cl.$^7$ .............................................. H02M 3/335
(52) U.S. Cl. .................................. 363/21.15; 363/21.07
(58) Field of Search ........................... 363/21.15, 21.16, 363/21.17, 21.12, 21.7, 21.8, 21.9, 21.1, 49, 97, 131

(56) References Cited

U.S. PATENT DOCUMENTS

| 3,769,568 | A | | 10/1973 | Hamilton et al. | |
|---|---|---|---|---|---|
| 4,586,120 | A | | 4/1986 | Malik et al. | |
| 4,692,853 | A | * | 9/1987 | De Sartre et al. | ............. 363/49 |
| 5,675,485 | A | * | 10/1997 | Seong | .......................... 363/97 |

FOREIGN PATENT DOCUMENTS

| EP | 0 991 170 A1 | | 4/2000 | |
|---|---|---|---|---|
| EP | 09991170 A1 | * | 4/2000 | ................... 363/97 |
| JP | 2000156972 A | | 6/2000 | |
| WO | 00/72435 A1 | | 11/2000 | |

* cited by examiner

*Primary Examiner*—Rajnikant B. Patel
(74) *Attorney, Agent, or Firm*—Laurence A. Greenberg; Werner H. Stemer; Ralph E. Locher

(57) ABSTRACT

A switched mode power supply includes a primary coil, a switch element, a secondary circuit, and a control circuit. The switch element is wired in series with the primary coil, for applying a DC voltage to the primary coil according to a control signal. The secondary circuit is coupled to the primary coil with output terminals providing an output voltage. The control circuit prepares the control signal with a feedback signal dependent on the output voltage supplied to the control circuit. The control circuit includes a signal generation circuit to create the control signal and a protection circuit. The protection circuit has the effect that no control signal is delivered to the switch element, if the feedback signal reaches the value of a first reference signal after a first period after starting the control circuit.

18 Claims, 5 Drawing Sheets

SWITCHED-MODE POWER SUPPLY WITH A FUNCTION FOR DETECTING A BROKEN FEEDBACK LOOP

CROSS-REFERENCE TO RELATED APPLICATION

This application is a continuation of copending International Application No. PCT/EP01/07004, filed Jun. 21, 2001, which designated the United States and was not published in English.

BACKGROUND OF THE INVENTION

Field of the Invention

The present invention relates to a switched-mode power supply.

Switched-mode power supplies usually have a transformer with a primary coil and a secondary coil, a switching element, for example a semiconductor power switch, being connected in series with the primary coil in order to apply a direct voltage in switched mode to the primary coil in accordance with a drive signal. When the switching element is closed, the primary coil consumes power that is delivered to the secondary coil when the switching element is subsequently opened. The secondary coil is a part of a secondary circuit that has output terminals for connecting a load that is supplied with an output voltage present at the output terminals. The aim of this configuration is to keep the output voltage largely constant with changing loads and for changing direct voltages present at the primary coil. For this purpose, a controlled system is provided. The controlled system includes a feedback branch and a drive circuit for providing the drive signal to the switching element. The drive circuit is supplied via the feedback branch with a signal that is dependent on the output voltage, in order to generate the drive signal in the drive circuit in dependence on the output voltage in such a manner that the output voltage is at least approximately constant.

Problems will occur if the feedback branch is broken. The signal present at the drive circuit via the feedback branch then usually corresponds to a signal that, when the feedback branch is not broken, is present when the output voltage is very small or is zero. In this case, the drive signals are generated in such a manner that a maximum of power is transmitted to the secondary side in order to bring the output voltage to a desired setpoint value. Because it is not possible to distinguish between a broken feedback branch and an output voltage of zero in the drive circuit, there is a risk that parts of the switched-mode power supply will be destroyed if the maximum of power is transmitted to the secondary side when the feedback branch is broken.

SUMMARY OF THE INVENTION

It is accordingly an object of the invention to provide a switched-mode power supply with a function for detecting a broken feedback loop that overcomes the hereinaforementioned disadvantages of the heretofore-known devices of this general type, in which, damage to the switched-mode power supply is prevented in the event of the feedback branch being broken.

With the foregoing and other objects in view, there is provided, in accordance with the invention, a drive circuit having a signal generating circuit for generating the drive signal and a protective circuit. The protective circuit has the effect that, when the feedback signal reaches the value of a first reference signal, no drive signal is supplied to the switching element. For this purpose, the protective circuit can drive, for example, the signal generating circuit in order to prevent the generation of a drive signal, or the protective circuit can break the connection between the signal generating circuit and the switching element, for example via a switch, if there is to be no drive to the switching element.

A broken feedback branch is usually characterized by a high signal at an input of the drive circuit to which the feedback branch is connected. In this case, the drive to the switching element is prevented by the protective circuit if the feedback signal exceeds the value of the first reference signal. In the case, where a broken feedback branch is characterized by a low signal at the input of the drive circuit, the drive to the switching element is broken if the feedback signal drops below the value of the first reference signal.

When the switched-mode power supply is switched on or at the beginning of the generation of the drive signal, respectively, the output voltage is still zero and then increases with increasing power consumption. Shortly after the switched-mode power supply is switched on, the feedback signal assumes values that correspond to the values of the feedback signal when the feedback branch is broken. To prevent the drive to the switching element to be interrupted again shortly after the switched-mode power supply is switched on, the protective circuit is constructed in such a manner that it only prevents the drive to the switching element on the feedback signal reaching the value of a first reference signal after a first period has elapsed after a start of the drive circuit.

In the switched-mode power supply according to the invention, interrupting the drive to the switching element prevents further energy from being transferred to the secondary side if, after a starting phase has elapsed, the value of the feedback signal indicates that the feedback branch is broken. This prevents the switched-mode power supply from being destroyed or damaged.

According to an embodiment of the invention, the switched-mode power supply has a first voltage supply circuit coupled to the primary coil for providing a supply voltage for the drive circuit. In this configuration, the protective circuit has the effect that no drive signal is supplied to the switching element if, during a second period after the start of the switched-mode power supply or of the drive circuit, respectively, the supply voltage reaches the value of a second reference signal and if at the same time the feedback signal has reached the value of the first reference signal.

This ensures that the drive to the switching element, and thus the power transfer to the secondary side, is interrupted if the feedback branch is broken and no load is connected to the secondary circuit. This is because, if no load is connected to the secondary circuit and power is still transferred to the secondary side because no attention is paid to a possible break in the feedback branch during the first period after the switched-mode power supply has been switched on, the voltage at the output terminals of the secondary circuit rapidly rises and could lead to damage at the switched-mode power supply. Due to the fact that the first voltage supply circuit is coupled to the primary coil, the supply voltage supplied by the first voltage supply circuit provides information about the output voltage of the secondary circuit which is also coupled to the primary coil. If the supply voltage rises very steeply within the second period after the drive circuit has been switched on and then reaches the value of the second reference signal, this indicates a non-existent secondary load and the drive to the switching element is then interrupted by the protective circuit.

According to a further embodiment of the invention, a second voltage supply circuit is provided in the drive circuit. The voltage supply circuit generates the internal supply voltages required for operating the drive circuit from the supply voltage supplied by the first voltage supply circuit. The second voltage supply circuit preferably switches off the drive circuit when the supply voltage reaches the value of a lower reference voltage and switches on the drive circuit again when the supply voltage subsequently again reaches the value of an upper reference voltage. The drive circuit is switched off by the second voltage supply circuit, for example, by interrupting the provision of the internal supply voltages.

The supply voltage drops to the value of the lower reference voltage if the drive to the switching element is interrupted and the primary coil no longer delivers any power to the first voltage supply circuit. Because the drive circuit then still consumes current from the first voltage supply circuit, the supply voltage drops. After the lower reference voltage has been reached and the drive circuit has been switched off, the first voltage supply circuit again builds up a supply voltage in order to switch the drive circuit on again via the second voltage supply circuit after an upper reference voltage has been reached. The first voltage supply circuit is preferably connected via a very large resistance to the direct voltage which is also supplied to the primary coil. A supply voltage can be built up in the first voltage supply circuit via this resistance even if the primary coil has not yet consumed any power which could be delivered to the first voltage supply circuit.

Other features that are considered as characteristic for the invention are set forth in the appended claims.

Although the invention is illustrated and described herein as embodied in a switched-mode power supply with a function for detecting a broken feedback loop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Unless otherwise specified, identical reference symbols represent identical components, identical signals and identical time intervals with identical significance in the figures.

Figure 1:
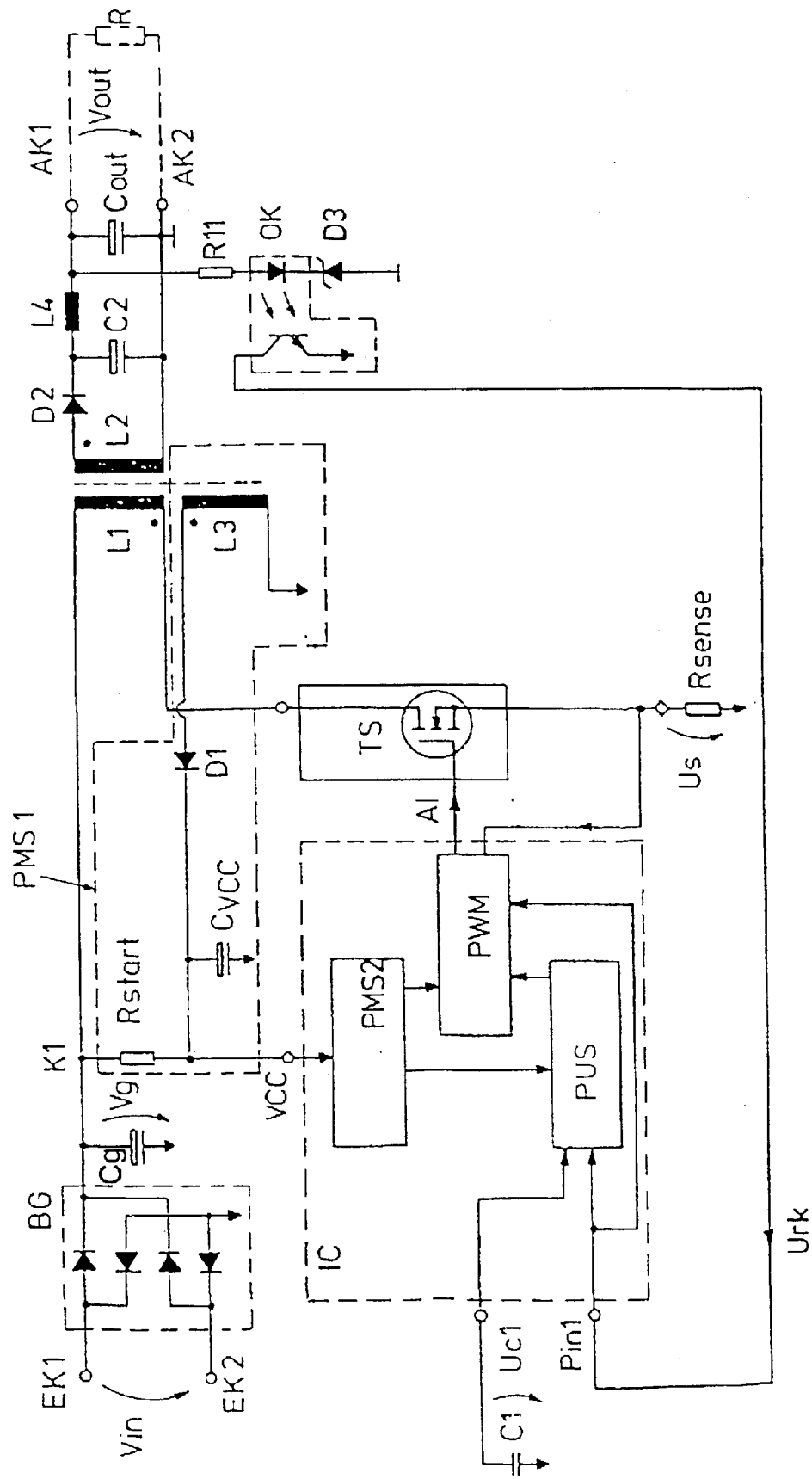
FIG. 1 is a circuit diagram showing an overall representation of a switched-mode power supply according to the invention.
Figure 2:
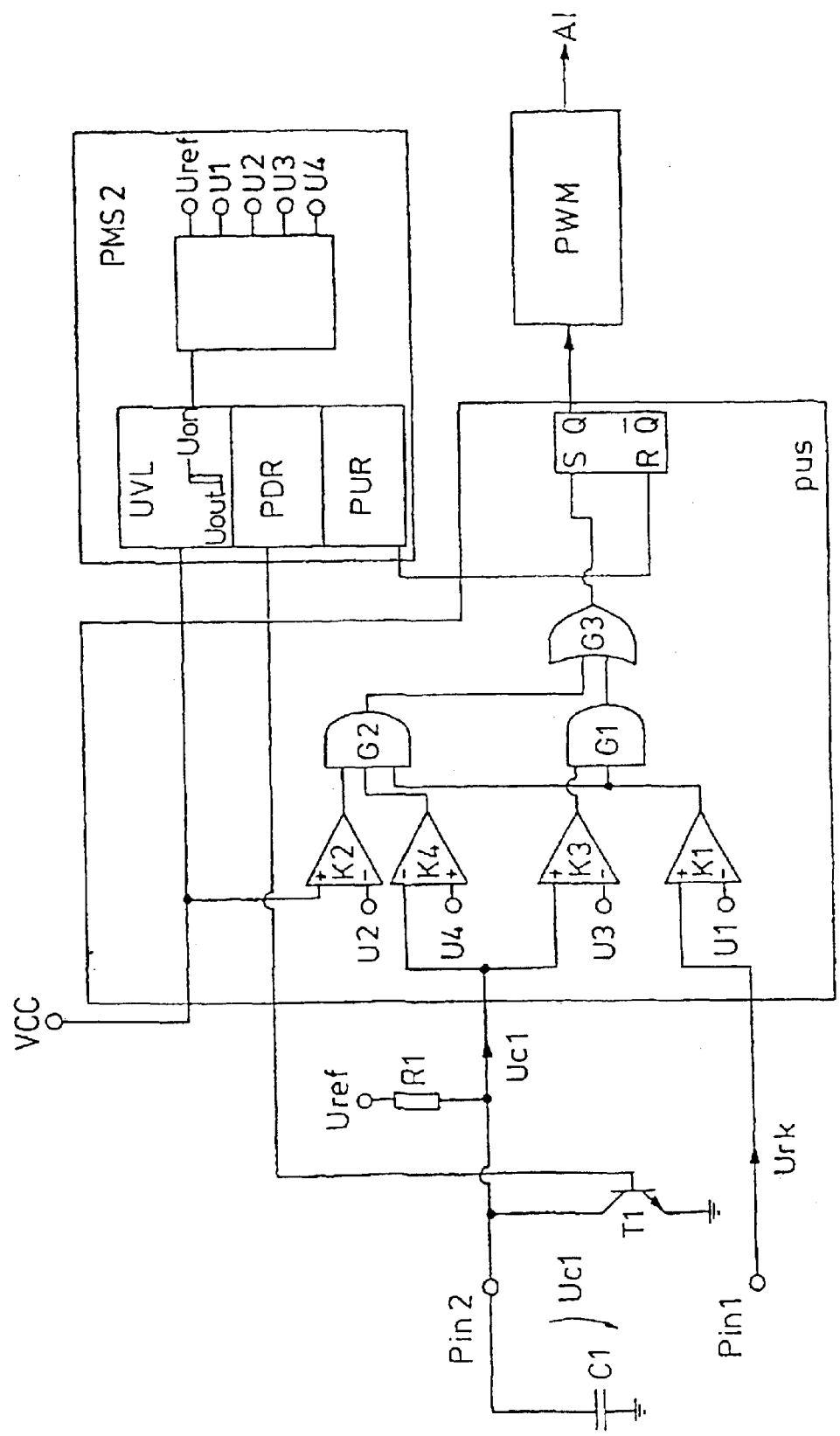
FIG. 2 is a circuit diagram showing a detailed representation of an embodiment of a drive circuit of the switched-mode power supply according to the invention.

Referring now to the figures of the drawings in detail and first, particularly to FIG. 1 thereof, there is shown a block diagram of an embodiment of the switched-mode power supply according to the invention. FIG. 2 shows a detailed representation of a drive circuit IC of the switched-mode power supply. The switched-mode power supply shown has input terminals EK1, EK2 that are supplied with an input voltage Vin. The input voltage Vin used is usually an alternating voltage within a range of between 85 V and 270 V. The input terminals EK1, EK2 are followed by a bridge rectifier BG having four diodes. The bridge rectifier BG is followed by a capacitor Cg. The bridge rectifier BG and the capacitor Cg generate from the alternating input voltage Vin a rectified voltage Vg which is present across the capacitor Cg.

The switched-mode power supply also has a transformer with a primary coil L1 and a secondary coil L2, a series circuit of the primary coil L1 and of a switching element TS, for example a semiconductor power switch, being connected in parallel with the capacitor Cg. The switching element TS is used for the switched application of the direct voltage Vg to the primary coil L1 as determined by a drive signal Al provided by a drive circuit IC. When the switch TS is closed, the direct voltage Vg is present across the primary coil L1, as a result of which the primary coil L1 consumes power. If the switch TS is subsequently opened, the power stored in the primary coil L1 is delivered to the secondary coil L2. The secondary coil L2 is part of a secondary circuit, which has a diode D2 for rectification and a filter, which follows the diode D2, with capacitors C2, Cout and an inductance L4. The secondary circuit has output terminals AK1, AK2 at which an output voltage Vout is present in parallel with the capacitor Cout. A load R, which is shown dashed as a resistive impedance in the exemplary embodiment, can be connected to the output terminals AK1, AK2.

It is the object of the switched-mode power supply to keep the output voltage Vout largely constant both for different input voltages Vin, and thus different rectified voltages Vg, and for changing loads R. The drive circuit IC is, therefore, supplied with a feedback signal Urk, which depends on the output voltage Vout, for generating the drive signal AI at a first input terminal Pin1. The drive signal AI is generated in the drive circuit by a signal generating circuit PWM that is, for example, a pulse-width modulator operating in current mode. The drive signal AI usually includes a sequence of drive pulses and the frequency and/or the period of the individual pulses can vary. In addition to the feedback signal Urk, the signal generating circuit PWM is supplied with a current signal Us that depends on the current through the primary coil L1 and that is present at a current sensing resistor Rsense connected in series with the switching element Ts.

If the output voltage Vout drops below a predetermined setpoint value, the switching element TS is driven via the drive signal AI of the signal generating circuit PWM in such a manner that the switching element TS, after having been closed, in each case remains closed for a longer time in order to increase the power consumption of the primary coil L1 and the subsequent power delivery to the secondary circuit. If the output voltage Vout increases above the predetermined setpoint value, the switching element, after having been switched on, in each case remains closed for shorter periods so that the primary coil L1 only consumes a low amount of power. The drive pulses of the drive signal AI are preferably generated at fixed periodic time intervals by the signal generating circuit PWM and the duration of the drive pulses varies for controlling the output voltage Vout.

To provide the feedback signal Urk at the input terminal Pin1 of the drive circuit IC, the switched-mode power supply has a feedback branch which, on the one hand, is connected to an output terminal AK1 of the secondary circuit and, on the other hand, to the input terminal Pin1 of the drive circuit IC. To detect the output voltage Vout, a series circuit of a resistor of a light-emitting diode and of a further diode D3 is connected to the output terminal AK1. The light-emitting diode is a component of an optocoupler OK that transfers the signal present at the output terminal AK1 to the input Pin1 of the drive circuit IC. The optocoupler OK produces an inversion of the signal present at the output terminal AK1, i.e. a very small output voltage Vout results in a very large feedback signal Urk and a very large output voltage Vout causes a very small feedback signal Urk.

If the feedback branch, particularly the connection of the optocoupler OK, is broken, a very large signal Urk is present at the input Pin1 of the drive circuit IC that would only be present if the output signal Vout is very small when the feedback branch is not broken. To prevent the signal generating circuit PWM, which cannot distinguish between a broken feedback branch and a very small output signal Vout, from driving the switching element TS in such a manner that it in each case remains closed for a long time after it has been closed, and thus a maximum of power is transmitted to the secondary side, a protective circuit PUS is provided in the drive circuit IC, to which the feedback signal Urk is supplied. The protective circuit PUS is constructed in such a manner that it prevents the switching element TS from being driven if the feedback signal Urk exceeds the value of a first reference signal U1 if other secondary conditions explained in greater detail in the text which follows are met.

The switched-mode power supply also has a first voltage supply circuit PMS1 which is coupled to the primary coil L1 via a third coil L3. A rectifier including a diode D1 and a capacitor $C_{VCC}$ is connected in parallel with the third coil L3. A supply voltage VCC that is supplied to the drive circuit IC being present across the capacitor $C_{VCC}$. The first voltage supply circuit PMS1 is also connected via a resistor Rstart to a terminal K1 at which the rectified voltage Vg is present. As long as no adequate supply voltage VCC is available for the drive circuit IC, the switching element cannot be driven. In this case, a current flows via the very large resistor Rstart to the capacitor $C_{VCC}$ until the supply voltage VCC has assumed a sufficiently large value for driving the drive circuit IC and thus the switching element TS. After that, the capacitor $C_{VCC}$ is essentially fed with the current consumed by the third coil L3 from the primary coil L1.

In the drive circuit IC, a second voltage supply circuit PMS2 is provided which generates from the supply voltage VCC internal voltages Uref, U1, U2, U3, U4, which are required for operating the drive circuit IC.

The configuration and the operation of a first embodiment of the drive circuit IC according to the invention is shown in FIG. 2. In the exemplary embodiment, the protective circuit PUS shown is connected to the signal generating circuit PWM in order to enable the signal generating circuit PWM for generating a drive signal AI or to inhibit it. For this purpose, the protective circuit PUS has an RS flip-flop, one output of which is connected to the signal generating circuit PWM. The protective circuit PUS enables the signal generating circuit PWM when the RS flip-flop is reset. The protective circuit PUS inhibits the signal generating circuit PWM when the flip-flop is set.

The protective circuit PUS shown fulfills two functions. On the one hand, it inhibits the signal generating circuit PWM when the feedback signal Urk, after a first period T1 has elapsed after a start of the drive circuit IC, exceeds the value of a first reference signal U1. On the other hand, the protective circuit PUS inhibits the signal generating circuit PWM even if the supply voltage VCC, within a second period T2 after the start of the drive circuit, exceeds the value of a second reference signal U2 and moreover the feedback signal URK is greater than the first reference signal U1.

The protective circuit PUS has a first comparator K1, one input of which is supplied with the feedback signal Urk and the other input of which is supplied with the first reference signal U1. A high level is present at the output of the first comparator K1 when the feedback signal Urk exceeds the value of the first reference signal U1. A third comparator K3 of the protective circuit PUS is supplied with a start phase signal Uc1 at one input and with a third reference signal U3 at another input. A high level is present at an output of the third comparator K3 when the start phase signal Uc1 exceeds the value of the third reference signal U3. The start phase signal Uc1 is generated by a series circuit of a resistor R1 and a capacitor C1. A reference voltage Uref provided by the second voltage supply circuit PMS2 is present across this series circuit. A bipolar transistor T1 that can be driven by the second voltage supply circuit PMS2 is connected in parallel with the capacitor C1. If the drive circuit IC is in the switched-off state, i.e. if no internal supply voltages are provided by the second voltage supply circuit PMS2, the capacitor C1 is initially discharged. If the drive circuit IC is then started by the second voltage supply circuit PMS2 providing internal supply voltages, the capacitor C1 is charged up with an open transistor T1 and the start phase signal Uc1 begins to rise. The outputs of the first and third comparators K1, K3 are supplied to a first AND gate G1, the output of which is supplied via an OR gate G3 to the SET input of the RS flip-flop. The RS flip-flop is only started by the start phase signal Uc1 and the feedback signal Urk if the feedback signal Urk is greater than the first reference signal U1 after the start phase signal Uc1 has exceeded the value of the third reference signal U3. After the drive circuit IC has been started, the feedback signal Urk is thus "gated out" for a first period T1. The first period T1 is given by the period up to which the start phase signal Uc1 exceeds the third reference signal U3.

After the switched-mode power supply and the drive circuit IC, respectively, have been started, power must first be transferred from the primary coil L1 to the secondary side L2 of the switched-mode power supply according to FIG. 1 until the output voltage Vout reaches its nominal value. At the beginning, the output voltage Vout is still very small which results in a large feedback signal Urk. To prevent then that the signal generating circuit PWM is inhibited again shortly after having been switched on because the feedback signal Urk is too large, the feedback signal Urk is gated out for the first period T1 after the starting of the drive circuit IC in the manner mentioned above. If, after this first period T1 after the start has elapsed, the feedback signal Urk still exceeds the value of the first reference signal, this indicates a break in the feedback branch and the signal generating circuit is inhibited via the first and third comparator K1, K3, the AND gate G1, the OR gate G3 and the RS flip-flop.

The protective circuit PUS has a second comparator K2, one input of which is supplied with the supply voltage VCC and the other input of which is supplied with a second reference signal U2. At the output of the second comparator K2, a high level is present when the value of the supply voltage VCC exceeds the value of the second reference signal U2. A fourth comparator K4 is supplied with the start phase signal Uc1 at one input and with a fourth reference signal U4 at another input, and at the output of the fourth comparator K4 a high level is present until the start phase signal Uc1 reaches the value of the fourth reference signal U4 after the drive circuit IC has been started. The outputs of the second and fourth comparator K2, K4 and the output of the first comparator K1 are supplied to a second AND gate G2, the output of the second AND gate G2 being supplied to the SET input of the RS flip-flop via the OR gate G3.

The first, second, and fourth comparator K1, K2, K4 and the second AND gate G2 inhibit the signal generating circuit PWM via the RS flip-flop if the supply voltage VCC exceeds the value of the second reference signal U2 during a second period T2 after the start, i.e. up to the time at which the start phase signal Uc1 reaches the value of the fourth reference signal U4, and if, at the same time, the feedback signal Urk is greater than the value of the first reference signal U1. The fact that the feedback signal Urk is greater than the first reference signal U1 in the starting phase and, at the same time, the supply voltage VCC is greater than the value of the second reference signal U2 indicates that the feedback branch is broken and that no load is connected to the output terminals AK1, AK2. Because the first voltage supply circuit PMS1 which provides the supply voltage VCC, and also the secondary circuit are coupled to the primary coil L1, a very high supply voltage VCC indicates a no-load condition on the secondary side. The first, second and fourth comparator K1, K2, K4 have the effect that, in the case of this fault, the signal generating circuit PWM is inhibited again shortly after the drive circuit IC has been switched on, in order to prevent the switched-mode power supply from being destroyed.

The second voltage supply circuit PMS2, which is supplied with the supply voltage VCC, has a voltage evaluating circuit UVL and first and second switching units PDR, PUR connected thereto. The first switching unit PDR is connected to the transistor T1 connected in parallel with the capacitor C1. The first switching unit PDR drives the transistor T1 in order to discharge the capacitor C1 when the supply voltage VCC has dropped to the value of a lower reference voltage Uout. The second switching unit PUR is connected to the RESET input of the RS flip-flop, the second switching unit PUR resetting the RS flip-flop when the rising supply voltage VCC reaches the value of an upper reference voltage Uon.

Figure 3:
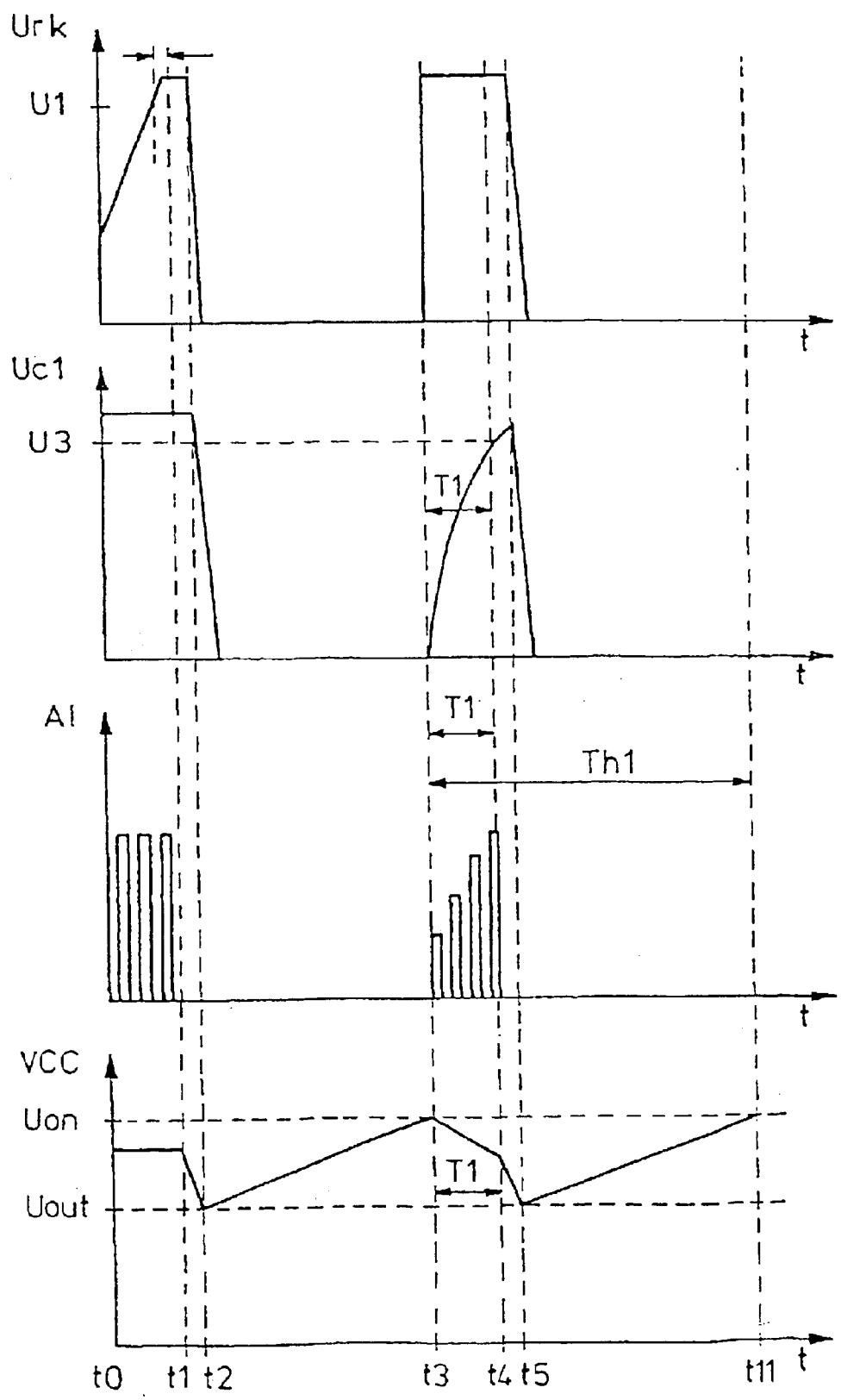
FIG. 3 is a graph showing the variation of selected signals of the drive circuit if the feedback branch is broken.

In the text that follows, the operation of a switched-mode power supply according to FIG. 1 with a drive circuit according to FIG. 2 is explained using FIG. 3 by describing selected signal variations.

In FIG. 3, the variations of the feedback signal Urk, of the start phase signal Uc1, of the drive signal AI and of the supply voltage VCC are plotted against time t. At a time t0, the switched-mode power supply operates faultlessly, i.e. drive pulses are generated for driving the switching element TS. The value of the feedback signal Urk is below the value of the first reference signal U1; the feedback branch is not broken. The capacitor C1 is completely charged at this time and the value of the start phase signal Uc1 is approximately equal to the value of the reference voltage Uref, the reference voltage Uref being above the value of the third reference signal U3 so that a high level is present at the output of the third comparator K3. The value of the supply voltage VCC is between the value of the lower reference voltage Uout and the value of the upper reference voltage Uon.

If the feedback signal Urk rises due to a break in the feedback branch, a high level occurs at the output of the first comparator K1 as soon as the feedback signal Urk reaches the value of the first reference signal U1 at time t1. The RS flip-flop is set and the signal generating circuit PWM is inhibited so that no further drive pulses AI are generated. Thus, the first voltage supply circuit PMS1 can no longer consume power via the primary coil L1 and the supply voltage VCC drops since the drive circuit IC is still consuming current and the current, which flows into the first voltage supply circuit PMS1 via the resistor Rstart, is not sufficient for covering this current demand. The supply voltage VCC drops until it reaches the value of the lower reference voltage Uout at a time T2. At this time, the transistor T1 is driven to discharge the capacitor C1 via the first switching unit PDR as a result of which the start phase signal Uc1 drops to 0. In addition, the second voltage supply PMS2 switches off the drive circuit C, i.e. no further internal supply voltages are generated and the feedback signal Urk also becomes 0. Because the drive circuit IC is now no longer consuming current, at least in approximation, the voltage VCC again begins to rise slowly because the capacitor $C_{VCC}$ is being charged up again via the resistor Rstart. When the supply voltage VCC then reaches the value of the upper reference voltage Uon, the second voltage supply circuit PMS2 switches the drive circuit IC on again, i.e. internal supply voltages are being generated again and drive pulses AI are being generated again from time t3.

If the feedback branch is still broken at this time t3, the feedback signal Urk immediately assumes a very high value again. The start phase signal Uc1 begins to rise due to the fact that the capacitor C1 is being charged up again via the resistor R1 when the transistor T1 is inhibited. Due to the fact that the current consumption of the drive circuit IC is now increased again, the supply voltage VCC drops. After a first period T1 after the drive circuit IC has started at time t3, the start phase signal Uc1 exceeds the value of the third reference signal U3 and the signal generating circuit PWM is inhibited again via the first and third comparator K1, K3, the first AND gate G1 and the RS flip-flop at time t4. The supply voltage VCC then drops again to the value of the lower reference voltage Uout, which it reaches at time t5 at which the drive circuit is switched off again by the second voltage supply circuit PMS2. The cycle described starts from the beginning and the drive circuit IC is switched on again at time t11 when the supply voltage VCC again reaches the value of the upper reference voltage Uon.

When the feedback branch is broken in the switched-mode power supply according to the invention, the drive circuit is thus switched off and periodically switched on again, one period of this process being shown by Ta in FIG. 3. After the start of the drive circuit IC, drive pulses AI are generated for a period T1 and, after a further period within which the supply voltage VCC drops to the value of the lower reference voltage Uout, the drive circuit IC is switched off again. In this manner, a destruction of the switched-mode power supply in the case of a broken feedback branch is reliably prevented in the switched-mode power supply according to the invention.

Figure 4:
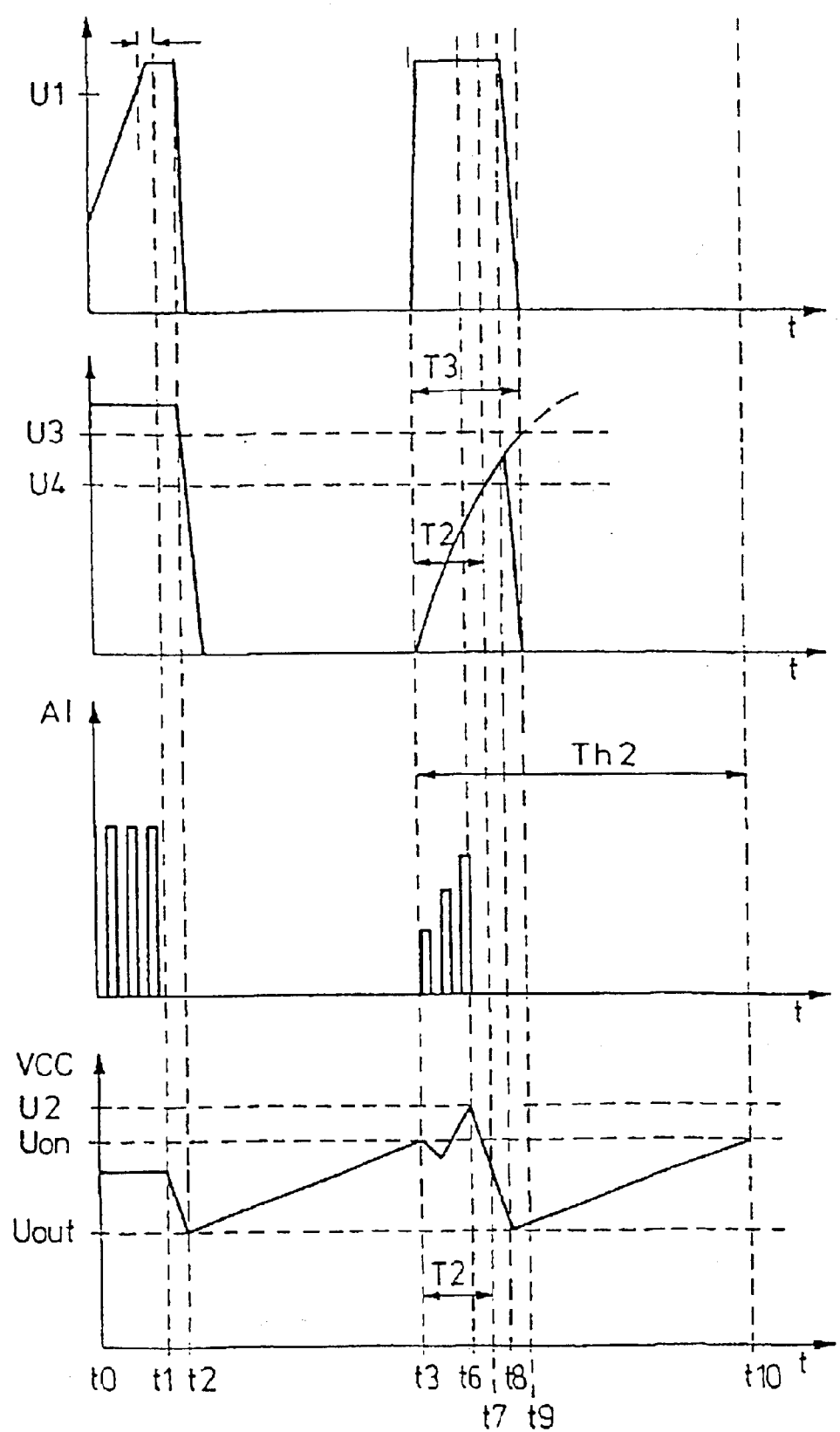
FIG. 4 is a graph showing the variation of selected signals of the drive circuit if the feedback branch is broken and the secondary load is not connected.

FIG. 4 shows the operation of the switched-mode power supply according to the invention with reference to a further fault case in which, apart from the feedback branch being broken, the secondary circuit is in a no-load condition.

Initially, it is again assumed that operation is correct at time t0, after which the feedback branch is broken and the feedback signal Urk reaches the value of the first reference signal U1 at time t1. After the drive circuit IC has been switched off at time t2, the supply voltage VCC rises again until it reaches the value of the upper reference voltage Uon at time t3, at which the drive circuit IC is switched on again. If after the time at which it is switched on again, after the supply voltage VCC has dropped slightly, a no-load condition of the switched-mode power supply occurs on the secondary side, the supply voltage VCC rises rapidly until it reaches the value of the second reference signal U2 at a time t6. If the time t6 is still within a second period T2 after the switching-on of the drive circuit IC, the signal generating circuit PWM is inhibited again at time t6 by the first, second and fourth comparator K1, K2, K4, the second AND gate G2, the OR gate G3 and the RS flip-flop. The period T2 is determined by the period which elapses until the start phase signal Uc1 reaches the value of the fourth reference signal U4. While the configuration of the first and third comparator K1, K3 and the first AND gate G1 can only inhibit the signal generating circuit PWM after the first period T1 has elapsed after the switching-on of the drive circuit IC when the feedback branch is broken, the configuration of the first, second, and fourth comparators K1, K2, K4 and the second AND gate G2 only inhibits the signal generating circuit PWM within the second period T2 after the switching-on of the drive circuit IC if the feedback branch is broken and the supply voltage VCC becomes very large, for example due to a variation on the secondary side.

After the signal generating circuit PWM has been inhibited at time t6, no further drive pulses AI are generated and no further power is delivered from the primary coil L1 to the first voltage supply circuit PMS1 as a result of which the supply voltage VCC drops. At time t8, at which the supply voltage VCC reaches the value of the lower reference voltage Uout, the drive circuit IC is switched off again by the second voltage supply circuit PMS2. The supply voltage VCC then can rise again slowly since the capacitor $C_{VCC}$ of the first voltage supply circuit PMS1 accepts current via the resistor Rstart until the supply voltage VCC again reaches the value of the upper reference voltage Uon at a time t10 and the drive circuit IC is switched on again. If the operation is correct, the supply voltage VCC can also rise to values above U2 after the second period t2 has elapsed.

In this fault case, too, the drive circuit IC is periodically switched off when the feedback branch is broken, and switched on again for short periods which prevents the switched-mode power supply from being destroyed.

Figure 5:
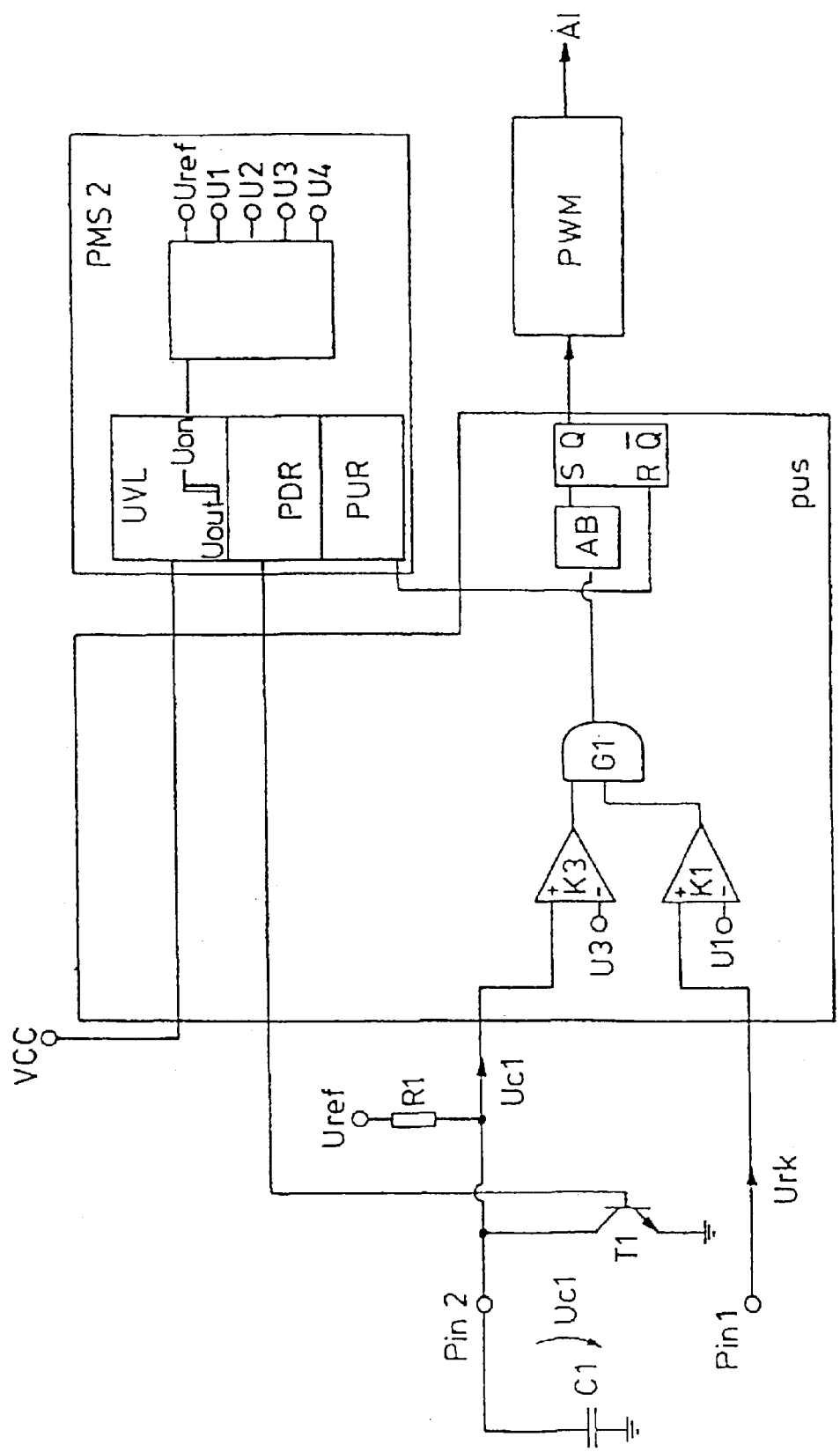
FIG. 5 is a circuit diagram showing a detailed representation of a further embodiment of a drive circuit according to the invention.

FIG. 5 shows a further embodiment of a drive circuit IC according to the invention, which differs from that shown in FIG. 2 in that the protective circuit PUS does not have the second and fourth comparators K2, K4 and the second AND gate G2 present in FIG. 2. Thus, the OR gate G3 according to FIG. 2 can also be omitted in the exemplary embodiment according to FIG. 5. The exemplary embodiment of the drive circuit according to FIG. 5 only allows a broken feedback branch to be detected after a first period T1 has elapsed after the start of the drive circuit IC, by using the first and third comparator K1, K3 and the first AND gate G1. The operation of this exemplary embodiment can be obtained by referring to the description for FIG. 3. In the exemplary embodiment according to FIG. 5, a gating-out unit AB which gates out very short signal pulses at its input and does not forward them to the output is connected between the first AND gate G1 and the RS flip-flop. This prevents short-time interference such as, for example, spikes from inhibiting the signal generating circuit PWM.

When the drive circuit IC is switched on again when the supply voltage VCC reaches the value of the upper reference voltage Uon, the flip-flop is reset by the second switching unit PUR, both in the exemplary embodiment according to FIG. 2 and in the exemplary embodiment according to FIG. 5, in order to enable drive pulses AI to be generated thereafter.

We claim:

1. A switched-mode power supply, comprising:
   a primary coil;
   a switching element connected in series with said primary coil for applying a direct voltage to said primary coil as determined by a drive signal;
   a secondary circuit coupled to said primary coil with output terminals for providing an output voltage; and
   a drive circuit for providing the drive signal, said drive circuit being supplied with a feedback signal, the feedback signal depending on the output voltage;
   said drive circuit having a signal generating circuit for generating the drive signal and having a protective circuit, said protective circuit inhibiting said signal generating circuit depending on a comparison of the feedback signal with a first reference signal;
   said protective circuit gating out the feedback signal during a period after a start of said drive circuit so that inhibiting of said signal generating circuit based on the comparison of the feedback signal with the first reference signal is prevented during the period; and
   said protective circuit inhibiting said signal generating circuit after the period has elapsed, after elapse of a shorter delay than the period, as soon as the feedback signal reaches the first reference signal.

2. The switched-mode power supply according to claim 1, wherein said protective circuit inhibits said signal generating circuit after the period has elapsed, immediately, as soon as the feedback signal reaches the first reference signal.

3. The switched-mode power supply according to claim 1, further comprising a first voltage supply circuit coupled to said primary coil for providing a supply voltage for said drive circuit.

4. The switched-mode power supply according to claim 3, wherein said protective circuit causes no drive signal to be supplied to said switching element if the supply voltage reaches a value of a second reference signal during a further period after the start of the drive circuit and the feedback signal reaches a value of the first reference signal.

5. The switched-mode power supply according to claim 4, wherein the further period is shorter than the period.

6. The switched-mode power supply according to claim 3, wherein said drive circuit has a second voltage supply circuit.

7. The switched-mode power supply according to claim 6, wherein said second voltage supply circuit switches off said drive circuit when the supply voltage reaches a value of a lower reference voltage.

8. The switched-mode power supply according to claim 6, wherein said second voltage supply circuit switches on said drive circuit when the supply voltage reaches a value of an upper reference voltage.

9. The switched-mode power supply according to claim 3, further comprising a supply terminal coupled to said first voltage supply circuit;
   said first voltage supply circuit also being coupled to said primary coil;
   said supply terminal receiving a direct voltage, the direct voltage depending on an input voltage.

10. The switched-mode power supply according to claim 7, wherein said second voltage supply circuit has output terminals for providing internal supply voltages and reference signals.

11. The switched-mode power supply according to claim 10, wherein said second voltage supply circuit does not provide any of the internal supply voltages and the reference signals when the supply voltage reaches the lower reference voltage and only provides internal supply voltages and reference signals again when the supply voltage reaches the upper reference voltage.

12. The switched-mode power supply according to claim 4, wherein said protective circuit has a comparator for comparing the feedback signal with the first reference signal.

13. The switched-mode power supply according to claim 12, wherein said protective circuit has a further comparator for comparing the supply voltage with the second reference signal.

14. The switched-mode power supply according to claim 4, wherein said protective circuit has a comparator for comparing the supply voltage with the second reference signal.

15. The switched-mode power supply according to claim 13, further comprising a logic circuit;

said protective circuit being supplied with a start phase signal;

said start phase signal changing after said drive circuit has been switched on;

said protective circuit having a third comparator for comparing the start phase signal with a third reference signal; and said comparators each having a respective output being supplied to said logic circuit for generating a switching signal for said signal generating circuit.

16. The switched-mode power supply according to claim 15, wherein:

said protective circuit has a fourth comparator for comparing the start phase signal with a fourth reference signal; and said fourth comparator has an output being supplied to said logic circuit for generating a switching signal for said signal generating circuit.

17. The switched-mode power supply according to 16, wherein said logic circuit has a latch, said latch being settable depending on the feedback signal and the value of the supply voltage and being resetable again by said second voltage supply circuit.

18. The switched-mode power supply according to claim 1, wherein the first reference signal indicates an interruption of the output voltage.

* * * * *